Figure 1:
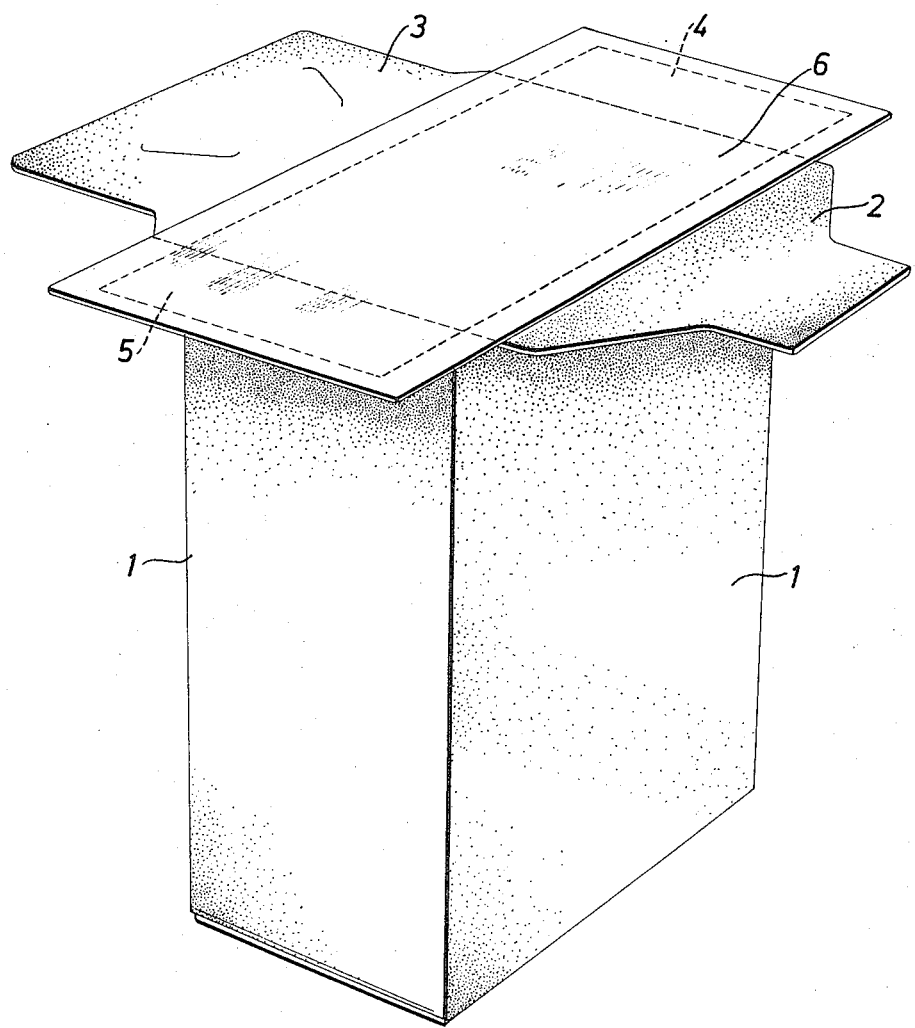

United States Patent [19]
Akerlund

[11] 3,787,257
[45] Jan. 22, 1974

[54] METHOD TO SEAL TWO MATERIALS TO EACH OTHER AND A DEVICE TO CARRY OUT THE METHOD

[75] Inventor: Jan Akerlund, Malmo, Sweden

[73] Assignee: AB Akerlund & Rausing, Lund, Sweden

[22] Filed: Nov. 30, 1971

[21] Appl. No.: 203,151

[30] Foreign Application Priority Data
Dec. 7, 1970  Sweden............................ 16509/70

[52] U.S. Cl................... 156/73, 156/306, 156/580, 156/583
[51] Int. Cl...................... B32b 31/16, B32b 31/00
[58] Field of Search....... 156/73, 306, 580, 3; 53/14

[56] References Cited
UNITED STATES PATENTS

| | | | |
|---|---|---|---|
| 2,896,387 | 7/1959 | Brock | 53/141 |
| 3,438,428 | 4/1969 | Balamuth et al. | 156/73 |
| 3,656,682 | 4/1972 | Giuliani | 53/14 |

Primary Examiner—Douglas J. Drummond
Attorney, Agent, or Firm—Pierce, Scheffler & Parker

[57] ABSTRACT

Two sheets of packaging material at least one of which has a plastic surface on at least one side are sealed together by moving them past a vibrating heater block which vibrates in a plane normal to the plane of the sheets. The sheets are located between the vibrating heater block and a support for these.

15 Claims, 6 Drawing Figures

METHOD TO SEAL TWO MATERIALS TO EACH OTHER AND A DEVICE TO CARRY OUT THE METHOD

The present invention relates to a method of sealing two or more sheets of packaging material to each other at least one of the surfaces of one of the sheets to be sealed housing a material which can be made active by heat.

The method according to the invention is characterized in that the two sheets are moved past a vibrating heater block with adjacent surfaces of the materials contacting each other and one of said sheets contacting said heater block, said sheets being simultaneously effectively supported on the opposite side relatively to said heater block.

By means of the method according to the invention it has proved possible to seal to each other, for instance, two paper surfaces covered with plastic which at the same time are very rapidly continuously or intermittently moved between a vibrating heater block and a supporting surface. To those skilled in the art, however, it will be evident that the principles of the invention are more generally applicable.

The present invention also relates to an apparatus for carrying out the method defined above, said apparatus being characterized by means for continuously moving two sheets past a vibrating heater block and by supporting means mounted on the opposite side of said materials relatively to the heater block, the distance between the supporting surface of said supporting means and the heating surface of said heater block being less than the sum of the amplitude of vibration of the heater block and the total thickness of the two sheets which are to be sealed to each other.

The invention particularly is intended to be applied to the sealing of various cardboard container constructions. In the following specification the invention therefore will be described with reference to two such embodiments. In this specification reference is made to the accompanying drawings illustrating two different container structures which can be sealed by means of the method according to the invention, and a schematically shown apparatus for carrying out the method.

FIG. 1 shows a first container construction in which a wafer has been attached to the mouth of a container tube by means of the method according to the invention.

Figure 2:
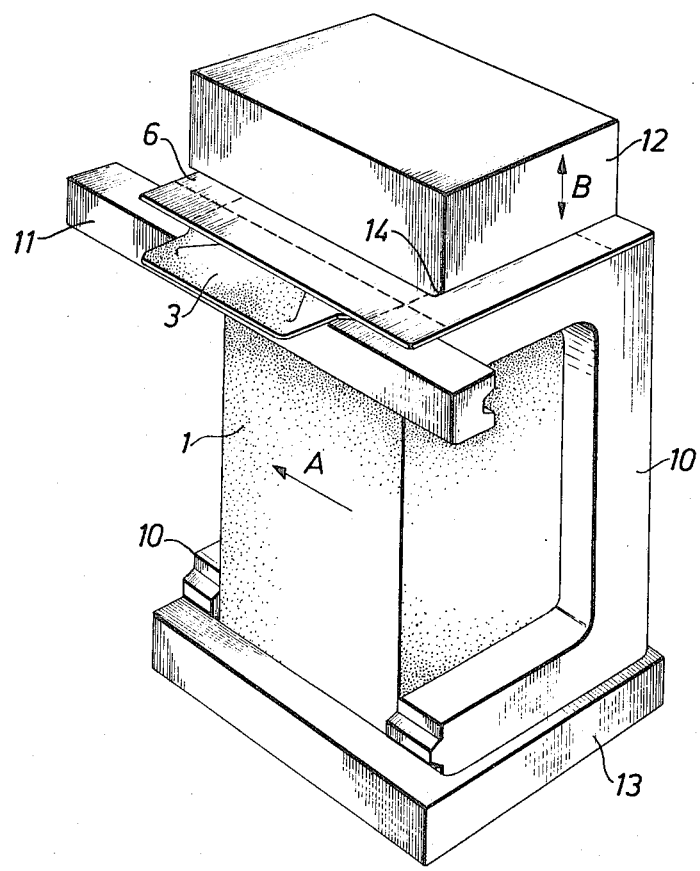

FIG. 2 schematically shows an apparatus which can be utilized in sealing of the tube according to FIG. 1.

Figure 3:
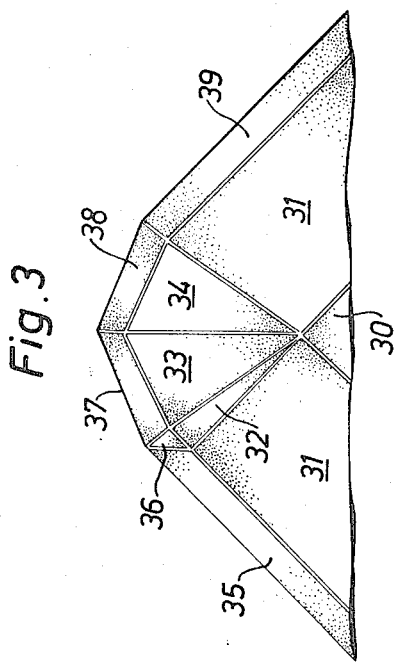
Figure 4:
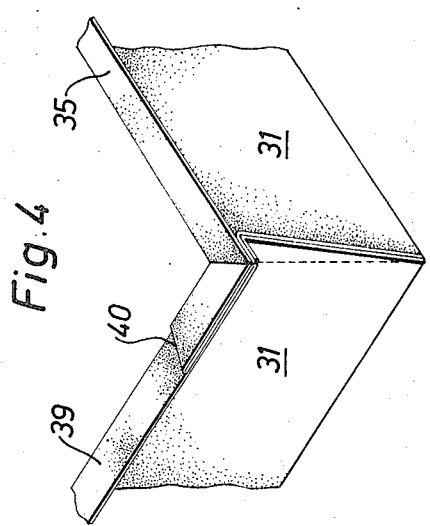

FIGS. 3 and 4 illustrate the corner of a container blank and said corner in the erected condition thereof, respectively, the purpose of these illustrations being to show a second type of container construction which can be sealed by means of the method according to the invention.

Figure 5:
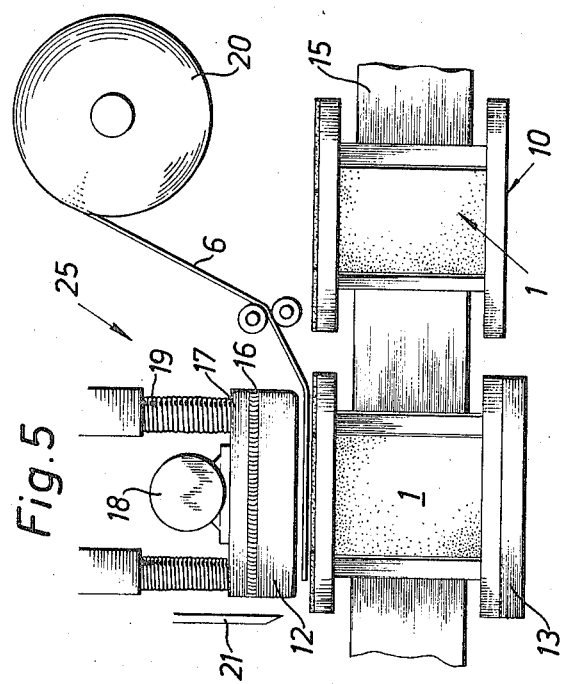
Figure 6:
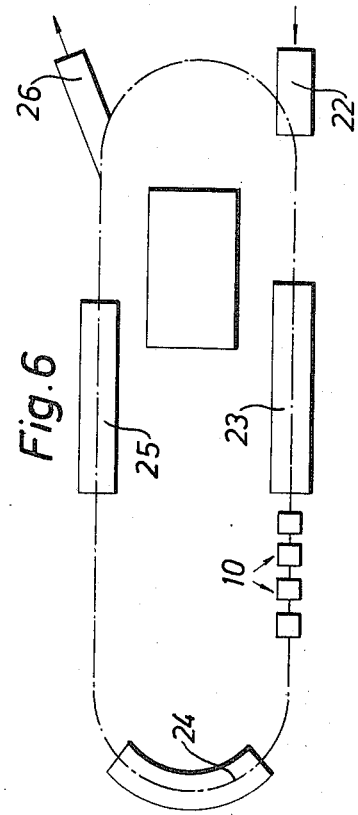

FIGS. 5 and 6 schematically show an apparatus for carrying out the method according to the invention.

The package which by way of example is shown in FIG. 1 comprises a cardboard container having a optional bottom closure and four upper sealing flaps 2, 3, 4 and 5. To the inside of the sealing flaps of the container a wafer 6 has been firmly sealed by means of the method according to the invention. Said wafer for instance may consist of a paper covered with plastic and the inside of the container flaps preferably are covered with the same plastic material.

FIG. 2 schematically shows the way in which the wafer 6 may be sealed to the cardboard container 1 by means of a simple device. Of course, the individual parts shown in FIG. 2 are mounted on a conventional machine structure. For the sake of clearness, however, the conventional parts have been omitted. The cardboard tube 1 initially is raised in a frame or holder 10 having a U-shaped horizontal cross section. Subsequently an optional bottom closure is made. The upper U-shaped cross section of the holder 10 is connected with a beam 11 to form a closed frame which supports the flaps 2 – 5. The wafer 6 which preferably comes from a roll of a paper material covered with plastic is positioned over the mouth of the container with the layer of plastic material turned downwards. Then the holder 10 together with the cardboard container and the wafer 6 positioned therein is moved in the direction of the arrow A and introduced under a vibrating heater block 12. Normally there will be a very small clearance between the heater block 12 and the holder 10. For this reason the heater block 12 is chamfered at 14. Said clearance is kept smaller than the sum of the amplitude of the heater block and the total thickness of the two materials which shall be sealed to each other.

The heater block 12 is vibrated by means of a vibrator (not shown) such as a motor vibrator or a magnetic vibrator. Preferably, the movement is directed so as to be substantially vertical, as indicated by the double arrow B. The frequency of oscillation of the heater block is in the order of between 120 and 20.000 oscillations per minute, and preferably in the order of 4.000 – 6.000 oscillations per minute. In any case a frequency should be used which substantially exceeds the number of packages moved past the heater block 12. The amplitude of oscillation should be from about one tenth to a few tenths mm.

FIGS. 5 and 6 schematically show the way in which the vibrator can be mounted. The holders 10 are mounted on a conveyor chain 15 or the like by means of which the holders together with the containers 1 mounted therein are moved to the space between a supporting plate 13 and the heater block 12. Into said space also a wafer 6 is continuously supplied. The heater block 12 by means of an insulating member 16 is secured to a supporting plate 17 which also carries a vibrator 18. The total assembly formed by said parts is suspended from springs 19 of suitable type. In practice it has proved that the holders 10 and the containers 1 positioned therein can be very rapidly and continuously advanced past the heater block 12 and simultaneously a very effective sealing is obtained.

The wafer material 6 comes from a roll 20 and preferably also consists of a paper material covered with plastic. Preferably also the inside of the container is covered with plastic. After the firm sealing to the insides of the container flaps the wafer is severed by means of the knife 21.

Preferably the container structure shown in FIGS. 1 and 2 is provided with a bottom closure which is of the same type as the illustrated top closure. This may be carried out by means of the arrangement schematically shown in FIG. 6. In this figure 22 represents a store for flat-folded pre-glued tube blanks. The blanks are erected in the holders 10. The bottom sealing is made at a first station 23. The construction of this station generally corresponds to FIG. 5 in that it is only necessary to turn the parts shown in this figure upside-down. Reference numeral 24 represents a schematically shown filling station. Between the stations 23 and 24 the inward folding of the bottom flaps takes place by means of conventional devices (not shown). Subsequently the top sealing takes place in a station represented by reference numeral 25. This station is illustrated in FIG. 5. The top sealing is finished by inward folding of the lid flaps 2 – 5 and locking the flaps in this position. This takes place between the top sealing station 25 and a discharge station 26.

In FIGS. 3 and 4 a further container structure is shown which can be sealed by means of the method according to the invention. Said container structure which is described in the Odenhogen U.S. Pat. No. 3,565,324 dated Feb. 23, 1971, consists of a cardboard trough having a bottom field 30 and preferably four side walls 31. The corner is formed by four smaller triangular corner fields 32, 33 and 34. The side wall fields 31 and the corner fields 32 – 34 of the trough are bounded at their outer edges by edge flange fields 35 – 39. As appears from FIG. 4, said edge flange fields jointly form an outwardly foldable edge flange adapted to support a wafer corresponding to the wafer 6 according to FIG. 1. The firm sealing of said wafer may be carried out by means of the device shown in FIG. 5. In order to secure the wafer firmly along the whole edge flange and particularly to the area adjacent the fold 40 shown in FIG. 4 either the heater block 12 or the holders 10 may be profilated. Thus, for instance, a track may be milled in the heater block in the advancing direction of the containers. Said track is positioned just opposite the field 37. In this way the pressure on this field is reduced and at the same time the pressure on the adjacent field 39 is increased.

Of course the invention is not restricted solely to the embodiments described above but may be modified within the scope of the following claims. Thus, for instance, the invention may be applied also to sealing of other materials to each other than those included in cardboard containers of various types. Furthermore, the form of the individual illustrated auxiliary means may be modified within broad limits.

I claim:

1. A method for sealing together the surfaces of two sheets of packaging material, at least one of said sheets having a heat sealable surface on the side to which the other sheet is to be sealed comprising moving the two sheets in contacting planar relation past a heater means vibrating at a frequency of from about 120 to about 20,000 oscillations per minute and at right angles to the plane of said sheets for applying vibrating pressure and heat to one side of said contacting sheets as they pass thereby while supporting said sheets on the side opposed to said vibrating heating means.

2. A method as claimed in claim 1, wherein the amplitude of the vibrations of the heater means is not less than about 0.1 mm.

3. A method as claimed in claim 1 wherein the frequency of vibration of the heater means is sufficiently high with respect to the longitudinal dimension of the heater means and the rate of movement of said sheets passed the heater means that all areas of the two sheets to be sealed together will be subjected to more than one vibration of the heater means before leaving the heater means.

4. A method as claimed in claim 1 wherein the frequency of vibration of the heater means is from about 4,000 to about 6,000 vibrations per minute.

5. Apparatus for sealing together the surfaces of two sheets of packaging material, at least one of said sheets having a heat sealable surface on the side to which the other sheet is to be sealed comprising a heater means, means for moving the two sheets of packaging material in contacting planar relation past said heater means, means for vibrating said heater means at a frequency of about 120 to about 20,000 oscillations per minute and at right angles to the plane of said two contacting sheets and support means on that side of said two contacting sheets opposite from said heater means, the distance between said supporting means and said heater means being less than the sum of the amplitude of vibration of said heater means and the thickness of the two contacting sheets.

6. Apparatus as claimed in claim 5 wherein one of said two sheets comprises flange-lkke flaps surrounding the top opening of a container and said supporting means supports said flange-like flaps and the other of said two sheets comprises a sealing wafer to be sealed to said flange-like flaps.

7. Apparatus as claimed in claim 6 in which said supporting means comprises a frame-like structure for supporting said container and includes a surface for supporting said flange-like flaps.

8. Apparatus as claimed in claim 7 wherein said means for moving the two sheets passed said heater means also moves said frame-like structure passed said heater means.

9. Apparatus as claimed in claim 7 wherein the supporting surface of said frame-like structure is spaced from the neutral position of said heater means a distance which is less than the sum of the amplitude of vibration of said heater means and the thickness of the two contacting sheets.

10. Apparatus as claimed in claim 9 wherein the distance between said supporting surface of said frame-like structure and said heater means is substantially equal to the thickness of the two sheets.

11. Apparatus as claimed in claim 5 wherein said heater means includes a heating block, a supporting plate and insulating means disposed between said heating block and said supporting plate, said vibrating means acting on said supporting plate.

12. Apparatus as claimed in claim 11 and further comprising a frame and spring means for supporting said heater means on said frame to prevent vibrations from being transmitted to said frame.

13. Apparatus as claimed in claim 5 wherein said vibrating means imparts a vibration of from about 4,000 to about 6,000 vibrations per minute to said heater means.

14. Apparatus as claimed in claim 5 wherein said vibrating means produces vibrations of said heater means having an amplitude of not less than 0.1 mm.

15. Apparatus as claimed in claim 5 wherein said heater means has such a longitudinal dimension and said sheet moving means moves the two sheets of packaging material at such a rate of speed passed said heater means that all areas of the two sheets to be sealed together will be subjected to more than one vibration of the heater means before leaving said heater means.

* * * * *